United States Patent
Odate

(10) Patent No.: US 11,511,687 B2
(45) Date of Patent: Nov. 29, 2022

(54) STEERING APPARATUS FOR VEHICLE

(71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1008 days.

(21) Appl. No.: 16/232,220

(22) Filed: Dec. 26, 2018

(65) Prior Publication Data

US 2019/0202383 A1   Jul. 4, 2019

(30) Foreign Application Priority Data

Dec. 28, 2017   (JP) .............................. JP2017-254249

(51) Int. Cl.
| | |
|---|---|
| *B60R 16/027* | (2006.01) |
| *B60R 16/03* | (2006.01) |
| *B62D 1/04* | (2006.01) |
| *B62D 1/06* | (2006.01) |
| *B60R 16/00* | (2006.01) |

(52) U.S. Cl.
CPC .......... *B60R 16/027* (2013.01); *B60R 16/005* (2013.01); *B60R 16/03* (2013.01); *B62D 1/046* (2013.01); *B62D 1/06* (2013.01); *B62D 1/065* (2013.01)

(58) Field of Classification Search
None
See application file for complete search history.

(56) References Cited

U.S. PATENT DOCUMENTS

| | | | |
|---|---|---|---|
| 4,547,655 A * | 10/1985 | Kurata ................... | B62D 1/065 |
| | | | 219/535 |
| 5,562,466 A * | 10/1996 | Kato ..................... | H01R 35/025 |
| | | | 439/15 |
| 5,775,798 A | 7/1998 | Yamada et al. | |

(Continued)

FOREIGN PATENT DOCUMENTS

| | | | |
|---|---|---|---|
| CN | 1486894 | 4/2004 | |
| CN | 101479132 | 7/2009 | |
| CN | 101947940 A * | 1/2011 | ........... B60Q 1/1461 |

(Continued)

OTHER PUBLICATIONS

Chinese Office Action for Chinese Patent Application No. 201811596607.5 dated Dec. 3, 2020.

(Continued)

*Primary Examiner* — Vicky A Johnson
(74) *Attorney, Agent, or Firm* — Amin, Turocy & Watson, LLP

(57) ABSTRACT

The steering heater 11 is provided on the surface of the skin material 23. The resistance value of the steering heater 11 is set to a level at which a heat quantity for heating the steering wheel 2 to a desired degree according to a voltage supplied from a power supply 32 which will be described later can be secured. The resistance value of the steering heater 11 is 1Ω or less, or the like, for example. When the resistance value of the steering heater 11 is set to 1Ω or less, for example, if the power supplied from the power supply 32 is about 13V, the heat quantity of the steering heater 11 is about 170 W and thus can appropriately heat the steering wheel 2.

7 Claims, 5 Drawing Sheets

(56) References Cited

U.S. PATENT DOCUMENTS 9,616,896 B1 * 4/2017 Letwin .................. B60K 35/00
2003/0034691 A1 2/2003 Wand

FOREIGN PATENT DOCUMENTS

| | | |
|---|---|---|
| CN | 103072487 | 5/2013 |
| CN | 105103649 | 11/2015 |
| CN | 105416372 | 3/2016 |
| CN | 205345012 | 6/2016 |
| CN | 106132295 | 11/2016 |
| JP | 60-260236 | 12/1985 |
| JP | 10-059190 | 3/1998 |
| JP | 2000-023929 | 1/2000 |
| JP | 2014-104814 | 6/2014 |
| JP | 2017-100557 | 6/2017 |

OTHER PUBLICATIONS

Chinese Notice of Allowance for Chinese Patent Application No. 201811596607.5 dated Jul. 20, 2021.
Japanese Office Action for Japanese Patent Application No. 2017-254249 dated May 21, 2019.

* cited by examiner

STEERING APPARATUS FOR VEHICLE

CROSS-REFERENCE TO RELATED APPLICATION

Priority is claimed on Japanese Patent Application No. 2017-254249, filed Dec. 28, 2017, the content of which is incorporated herein by reference.

BACKGROUND OF THE INVENTION

Field of the Invention

The present invention relates to a steering apparatus for a vehicle.

Description of Related Art

Conventionally, a steering apparatus including a heater for heating a steering wheel of a vehicle and an electrode for acquiring a heart rate signal of a driver who is holding the steering wheel is known (refer to Japanese Unexamined Patent Application, First Publication No. 2000-023929, for example). This steering apparatus decreases the contact resistance between the electrode for heart rate detection and the hands to stabilize acquisition of a heart rate signal by accelerating perspiration the hands of the driver according to the heating of the heater. The heater is embedded in the steering wheel, for example. The electrode is attached to the surface of the steering wheel, for example.

SUMMARY OF THE INVENTION

The steering apparatus according to the above-described conventional technology causes a problem that a wiring structure becomes complicated because the heater and the electrode are connected to different harnesses.

Furthermore, when a plurality of electrical components such as the heater and the electrode are connected to an external control device by means of a connector through the aforementioned harnesses or a cable reel around which a cable is spirally wound, for example, the number of contacts of the connector needs to be increased in order to increase the number of electrical components. Accordingly, when the number of contacts of the connector is limited, it is difficult to add electrical components to be disposed on the steering wheel.

An object of embodiments of the present invention devised in view of the aforementioned circumstances is to provide a steering apparatus for a vehicle which is capable of preventing a wiring structure from being complicated and preventing costs necessary for components from increasing even when a plurality of electrical components are disposed on a steering wheel.

To solve the aforementioned problem to accomplish the object, the present invention employs the following aspects.

(1) A steering apparatus for a vehicle according to one aspect of the present invention includes: a steering wheel; a plurality of electrical components provided in the steering wheel; a plurality of electrical contacts for supplying power to the electrical components or outputting signals from the electrical components to an external portion; and a switching device which switches, when the plurality of electrical components are commonly connected to any one of the plurality of electrical contacts, connection destinations connected to the one electrical contact among the plurality of electrical components.

(2) In (1), the plurality of electrical components may include a first electrical component and a second electrical component having different current regions in which current flows, and the one electrical contact to which the first electrical contact and the second electrical contact are commonly connected may be a ground line.

(3) In (2), the first electrical component may be a steering heater which has a larger current region than the second electrical component and heats the steering wheel, and the second electrical component may be at least either of a touch sensor which detects proximity or contact of a human body to or with the steering wheel and a steering switch for operating an on-board apparatus provided in the steering wheel.

(4) In (3), the steering apparatus for a vehicle may include a control device which controls the operation of the switching device, and the control device may perform control of switching the connection destinations in a period in which the steering heater can maintain a predetermined temperature.

(5) In any of (1) to (4), the plurality of electrical contacts may be connectors having a plurality of connection pins.

According to the steering apparatus for a vehicle according to the aspect described in (1), since the switching device switches connection destinations connected to one electrical contact among a plurality of electrical components, an increase in the number of electrical contacts can be curbed even when a plurality of electrical components are provided in the steering wheel. Accordingly, it is possible to prevent a wiring structure from becoming complicated and costs necessary for components from increasing.

In the case of (2), even when a first electrical component and a second electrical component having different current regions in which current flows are commonly connected to the ground line which is easily commonly used in a plurality of electrical components, it is also possible to prevent an electrical component having a larger current region from affecting an electrical component having a smaller current region.

In the case of (3), it is possible to prevent signals from the touch sensor and the steering switch from being hidden in noise and the like due to current flowing caused by the steering heater. Accordingly, appropriate operations of the touch sensor and the steering switch can be secured.

In the case of (4), an appropriate operation of the steering heater can be secured.

In the case of (5), even when the number of electrical contacts is limited according to specifications in a general-pulse connector and the like, for example, it is not necessary to increase the number of electrical contacts and it is possible to provide a plurality of electrical components in the steering wheel.

DETAILED DESCRIPTION OF THE INVENTION

Hereinafter, a steering apparatus for a vehicle according to an embodiment of the present invention will be described with reference to the attached drawings.

Figure 1:
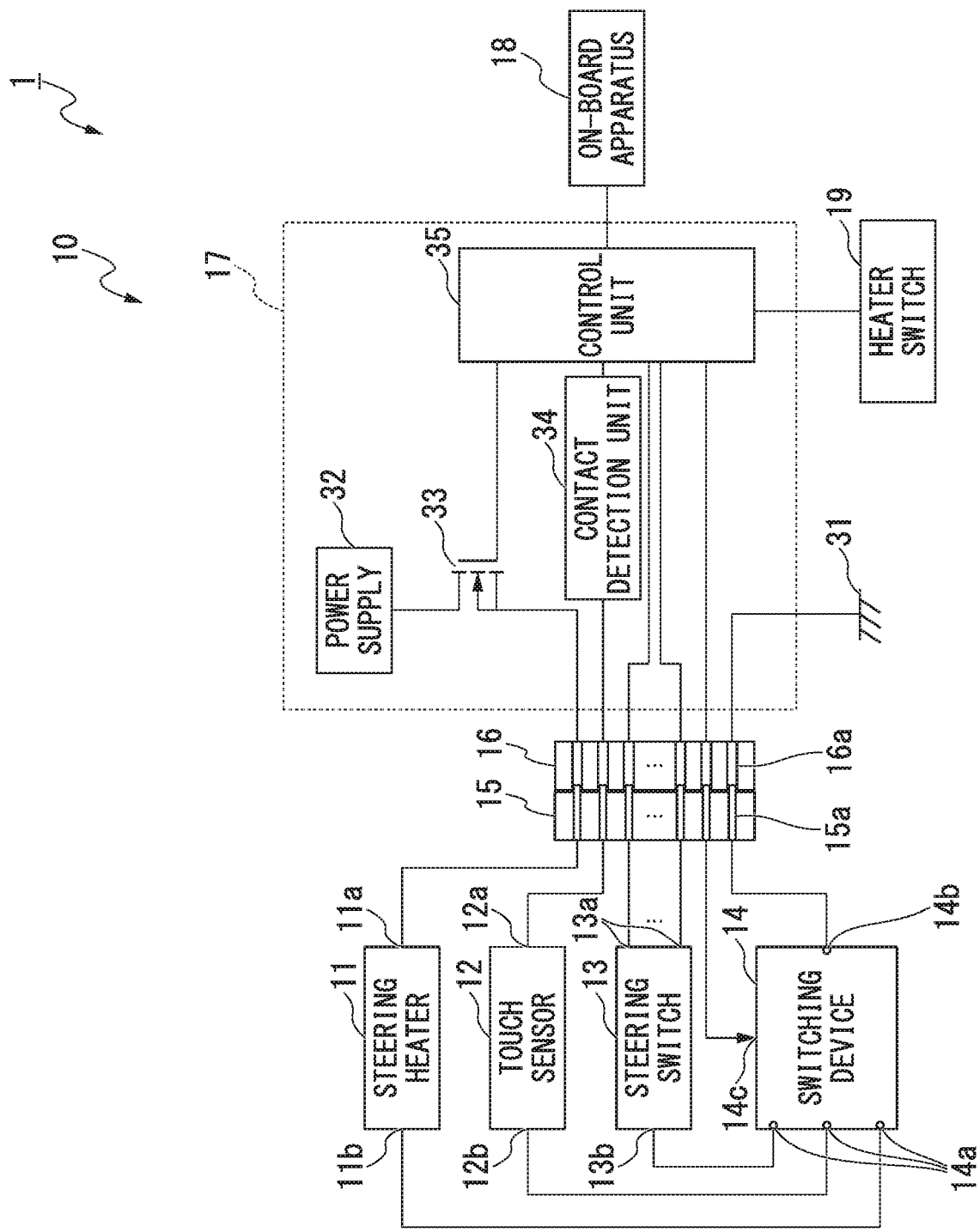
FIG. 1 is a block diagram showing a functional configuration of a steering apparatus for a vehicle according to embodiments of the present invention.
Figure 2:
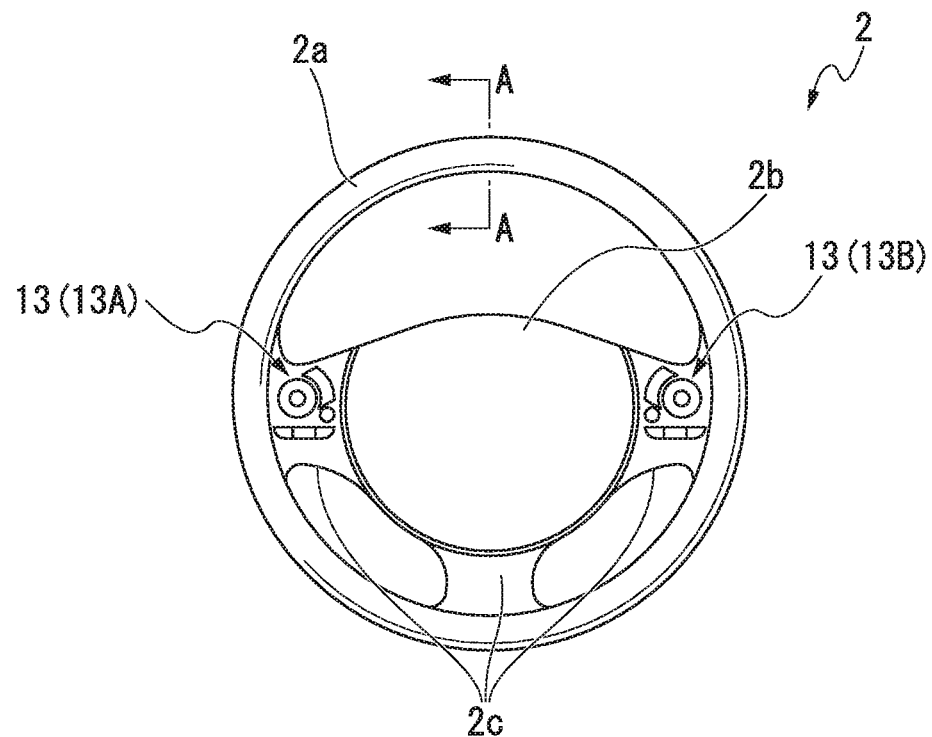
FIG. 2 is a front view showing a configuration of a steering wheel of the steering apparatus for a vehicle according to embodiments of the present invention.
Figure 3:
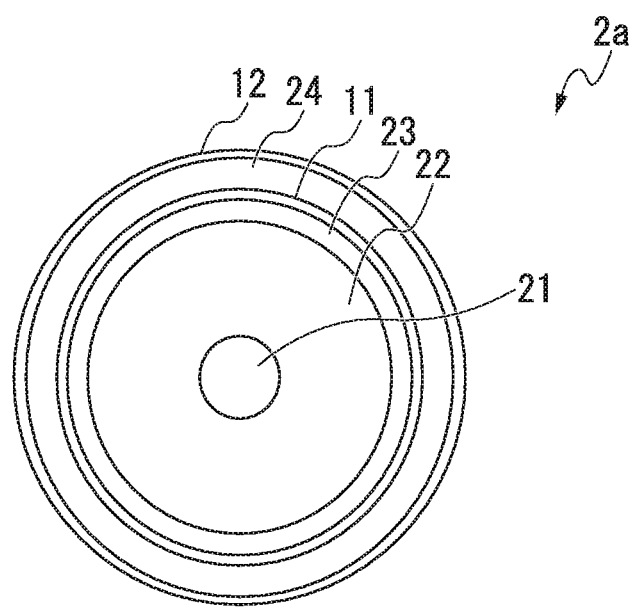
FIG. 3 is a cross-sectional view showing a configuration of a steering wheel for a vehicle according to embodiments of the present invention, taken in the direction of the arrow of FIG. 2.

The steering apparatus 10 for a vehicle according to the present embodiment includes a steering heater 11, a touch sensor 12, a steering switch 13, a switching device 14, a first connector 15, a second connector 16 and a control device 17 provided in a steering wheel 2 of a vehicle 1, as shown in FIG. 1, FIG. 2 and FIG. 3.

The steering heater 11 is formed of a conductive material such as a conductive coating material coated on the surface of the steering wheel 2, for example.

For example, the steering wheel 2 includes a rim part 2a, a hub part 2b and a spoke part 2c, as shown in FIG. 2. The external shape of the rim part 2a is formed in a circular form. The hub part 2b is connected to a steering shaft (not shown). The spoke part 2c is connected to the rim part 2a and the hub part 2b.

For example, as shown in FIG. 3, the rim part 2a of the steering wheel 2 includes a circular core 21, a resin material 22 covering the surface of the core 21 and a skin material 23 covering the surface of the resin material 22.

The steering heater 11 is provided on the surface of the skin material 23. The resistance value of the steering heater 11 is set to a level at which a heat quantity for heating the steering wheel 2 to a desired degree according to a voltage supplied from a power supply 32 which will be described later can be secured. The resistance value of the steering heater 11 is 1Ω or less, or the like, for example. When the resistance value of the steering heater 11 is set to 1Ω or less, for example, if the power supplied from the power supply 41 is about 13V, the heat quantity of the steering heater 11 is about 170 W and thus can appropriately heat the steering wheel 2.

The current region in which current flows of the steering heater 11 is relatively larger than the current region in which current flows of the touch sensor 12 and the steering switch 13.

A power supply terminal 11a of the steering heater 11 is connected to a connection pin 15a of the first connector 15. A ground terminal 11b of the steering heater 11 is connected to a first terminal 14a of the switching device 14.

The touch sensor 12 is formed of a conductive material such as a conductive coating material coated on the surface of a spacer 24 provided on the outer surface of the steering heater 11, for example. The spacer 24 is formed of an electrical insulating material. For example, the touch sensor 12 is a capacitive sensor having a human body H such as a driver as a capacitor having a capacitance Ch.

The current region in which current flows of the touch sensor 12 is relatively smaller than the current region in which current flows of the steering heater 11.

A signal terminal 12a of the touch sensor 12 is connected to a connection pin 15a of the first connector 15. A ground terminal 12b of the touch sensor 12 is connected to a first terminal 14a of the switching device 14.

The steering switch 13 is an input device disposed at a position where it can be operated by a finger of a driver who grips the steering wheel 2 in order to drive the vehicle 1. For example, the steering switch 13 may be disposed on left and right spoke parts 2c. The steering switch 13 distinguishes between and detects a contact and an operation of an operator. For example, the steering switch 13 may include a plurality of mechanical switches which receive an operation from a finger of the operator and a plurality of capacitive sensors which detect a contact of a finger of the operator. For example, the mechanical switches may be switches including a cross key tilted by a finger of the operator, a push button pressed by a finger of the operator, and the like. The steering switch 13 detects a contact of a finger of the operator, outputs a detection signal corresponding to the contact, receives a pressing operation according to a finger of the operator and outputs an operation signal corresponding to the pressing operation.

The steering switch 13 receives operations with respect to operations of various on-board apparatuses 18 mounted in the vehicle 1. For example, a first steering switch 13A may receive operations with respect to video and audio apparatuses, a navigation device and a camera mounted in the vehicle 1, an information terminal carried by an occupant of the vehicle 1, and the like. For example, a second steering switch 13B may receive operations with respect to driving assistance operations, such as cruise control and lane keep assistance of the vehicle 1 controlled by a driving control device.

The current region in which current flows of the steering switch 13 is relatively smaller than the current region in which current flows of the steering heater 11.

A plurality of signal terminals 13a of the steering switch 13 are connected to a plurality of different connection pins 15a of the first connector 15. A plurality of ground terminals 13b of the steering switch 13 are connected to one first terminal 14a of the switching device 14.

For example, the switching device 14 is disposed inside of the hub part 2b of the steering wheel 2, or the like.

The switching device 14 includes a plurality of first terminals 14a, a single second terminal 14b and a single signal input terminal 14c. The ground terminals 11b, 12b and 13b of the steering heater 11, the touch sensor 12 and the steering switch 13 are respectively connected to the different first terminals 14a of the switching device 14. Different connection pins 15a of the first connector 15 are respectively connected to the second terminal 14b and the signal input terminal 14c of the switching device 14.

The switching device 14 includes a switching element which operates according to a signal input to the signal input terminal 14c. The switching device 14 connects or disconnects at least any of the plurality of first terminals 14a to or from the single second terminal 14b according to a signal input to the signal input terminal 14c. For example, the switching device 14 may connect the first terminal 14a to which the steering heater 11 is connected, the first terminal 14a to which the touch sensor is connected 12 and the first terminal 14a to which the steering switch 13 is connected to the second terminal 14b while switching the first terminals 14a. That is, the switching device 14 connects a first terminal 14a to which an electrical component having a relatively large current region is connected and a first terminal 14a to which an electrical component having a relatively small current region is connected to the second terminal 14b while switching the first terminals 14a.

For example, the switching device 14 may execute a switching operation according to an on/off switching signal input from a control unit 35 to the signal input terminal 14c. When the on/off switching signal represents an on state, the switching device 14 may connect only the first terminal 14a to which the steering heater 11 is connected to the second terminal 14b. When the on/off switching signal represents an off state, the switching device 14 may connect only the first terminal 14a to which the touch sensor 12 is connected and the first terminal 14a to which the steering switch 13 is connected to the second terminal 14b.

For example, when the on/off switching signal is not input to the signal input terminal 14c, the switching device 14 connects only the first terminal 14a to which the touch sensor 12 is connected and the first terminal 14a to which the steering switch 13 is connected to the second terminal 14b as in the off state of the on/off switching signal.

The first connector 15 and the second connector 16 are formed in such a manner that they are detachably attached to each other.

The first connector 15 includes a predetermined number of connection pins 15a. The plurality of different connection pins 15a are respectively connected to the power supply terminal 11a of the steering heater 11, the signal terminal 12a of the touch sensor 12, the plurality of signal terminals 13a of the steering switch 13, and the second terminal 14b and the signal input terminal 14c of the switching device 14.

The second connector 16 includes a predetermined number of connection sockets 16a connected to the respective connection pins 15a of the first connector 15. The plurality of different connection sockets 16a are connected to the control device 17.

The control device 17 includes a body ground 31, a power supply 32, a switch 33, a contact detection unit 34 and the control unit 35.

The body ground 31 is connected to a connection socket 16a of the second connector 16.

The body ground 31 is connected to the second terminal 14b of the switching device 14 through the connection socket 16a of the second connector 16 and a connection pin 15a of the first connector 15.

That is, the body ground 31 is connected to the ground terminal 11b of the steering heater 11 and ground terminals 12b and 13b of the touch sensor 12 and the steering switch 13 while switching therebetween.

The power supply 32 is a DC power supply. The power supply 32 is connected to the power supply terminal 11a of the steering heater 11 through the switch 33, the first connector 15 and the second connector 16.

The switch 33 is a semiconductor switch such as a MOSFET, for example. The switch 33 is switched on and off by an on/off switching signal output from the control unit 35. The switch 33 switches between presence and absence of electrical conduction from the power supply 32 to the steering heater 11 by switching between connection and disconnection of the steering heater 11 to the power supply 32 according to the on/off switching signal.

For example, the gate of the switch 33 configured as a MOSFET, for example, may be connected to the control unit 35. The drain of the switch 33 is connected to the power supply 32. The source of the switch 33 is connected to the power supply terminal 11a of the steering heater 11 through the first connector 15 and the second connector 16. The switch 33 switches between on/off (connection/cutoff) between the drain and the source according to the on/off switching signal input from the control unit 35 to the gate.

Figure 4:
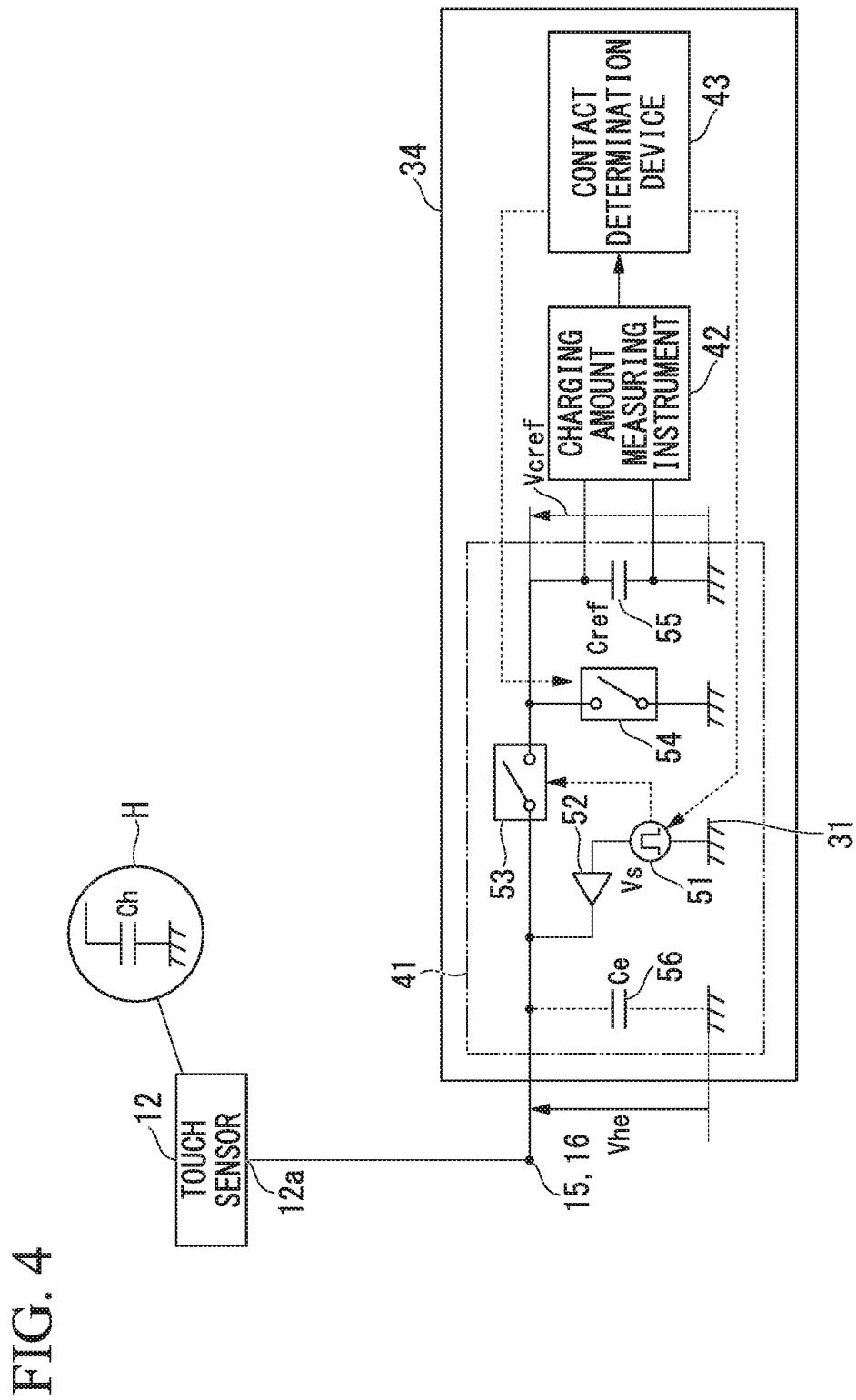
FIG. 4 is a block diagram showing a functional configuration of a contact detection unit of the steering apparatus for a vehicle according to embodiments of the present invention.

The contact detection unit 34 includes a contact measurement circuit 41, a charging amount measuring instrument 42 and a contact determination device 43, as shown in FIG. 4.

The contact measurement circuit 41 includes a pulse power supply 51, an amplifier 52, a first switch 53, a second switch 54 and a charging condenser 55 having a capacitance Cref. Meanwhile, since the contact measurement circuit 41 has a stray capacitance Ce in each component, wires and the like, each component, wires and the like are regarded as a virtual condenser 56 having the stray capacitance Ce in the following. The capacitance Cref of the charging condenser 55 is set to be sufficiently greater than the capacitance Ch of the human body H and the stray capacitance Ce.

The pulse power supply 51 and the amplifier 52 are connected in series. The second switch 54 and the charging condenser 55 are connected in parallel. The first switch 53 is connected between a serial circuit composed of the pulse power supply 51 and the amplifier 52 and a parallel circuit composed of the second switch 54 and the charging condenser 55. The output terminal of the amplifier 52 and the first switch 53 are connected to a connection socket 16a of the second connector 16. The output terminal of the amplifier 52 and the first switch 53 are connected to the signal terminal 12a of the touch sensor 12 through the connection socket 16a of the second connector 16 and a connection pin 15a of the first connector 15.

The pulse power supply 51 supplies a pulse voltage Vs having a predetermined frequency and a certain voltage value according to a power supply instruction output from the contact determination device 43.

The amplifier 52 amplifies the pulse voltage Vs supplied from the pulse power supply 51.

The first switch 53 switches to a conducting state according to rising of the pulse voltage Vs of the pulse power supply 51 and switches to a non-conducting state according to falling thereof. For example, the first switch 53 is a switching element such as a MOSFET.

The second switch 54 switches to a conducting state according to an on signal output from the contact determination device 43 and switches to a non-conducting state according to an off signal.

The charging condenser 55 absorbs charge accumulated in the human body H when the first switch 53 switches to a conducting state. The charging condenser 55 discharges accumulated charge to the body ground 31 when the second switch 54 switches to a conducting state.

The charging amount measuring instrument 42 measures a charging voltage Vcref of the charging condenser 55.

The contact determination device 43 outputs a power supply instruction and a power supply stop instruction to the pulse power supply 51 provided in the contact measurement circuit 41 regularly (e.g., every several tens to several hundreds of milliseconds, or the like). The contact determination device 43 outputs an on signal and an off signal to the second switch 54 for discharging of the charging condenser 55 along with output of the power supply stop instruction.

The contact determination device 43 monitors the number of pulses N of the pulse voltage Vs generated from the pulse power supply 51 and the charging voltage Vcref of the charging condenser 55 measured by the charging amount measuring instrument 42. The contact determination device 43 determines whether the human body is in a contact state or in a non-contact state by comparing a number of pulses Nj necessary for the charging voltage Vcref to reach a predetermined charging voltage threshold value Vcth with a predetermined pulse threshold value Nth. The determination result of the contact determination device 43 is output to the control unit 35.

Hereinafter, the operation of the contact detection unit 34 will be described in detail.

Meanwhile, a hands-on state, that is, a state in which the driver (human body H) is in contact with the touch sensor 12 is assumed in the following.

Figure 5:
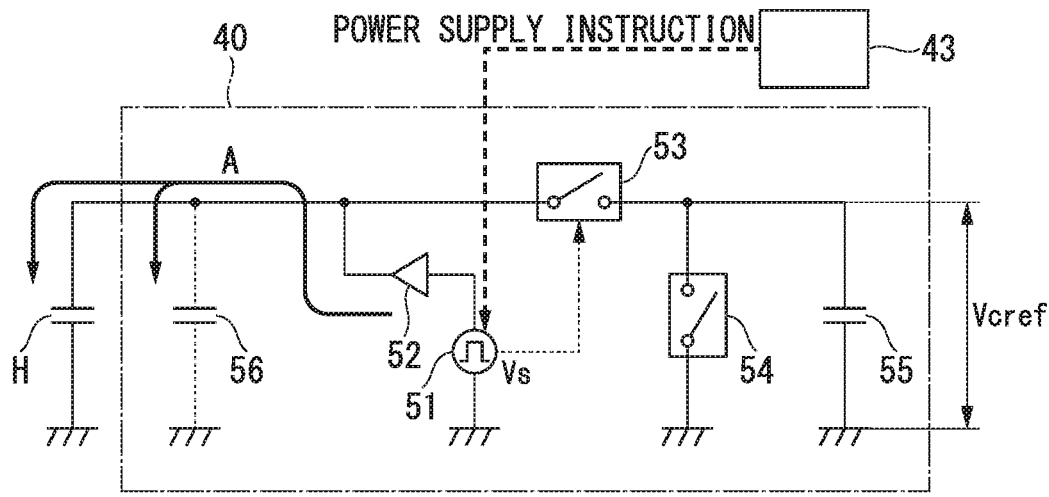
FIG. 5 is a diagram showing an example of the operation of the contact detection unit of the steering apparatus for a vehicle according to embodiments of the present invention and showing a state when power supply according to a pulse power supply is started.

The contact determination device 43 outputs the power supply instruction to the pulse power supply 51 for each of predetermined periods. The pulse power supply 51 starts power supply according to the power supply instruction. When the pulse voltage Vs of the pulse power supply 51 rises, the first switch 53 switches to a non-conducting state, as shown in FIG. 5. Here, charge moves in a direction indicated by an arrow A in FIG. 5. Accordingly, the voltage Vhe of the human body H and the virtual condenser 56 rises and thus the human body H and the virtual condenser 56 are charged.

Subsequently, when a pulse of the pulse power supply 51 falls, the first switch 53 switches to a conducting state.

Figure 6:
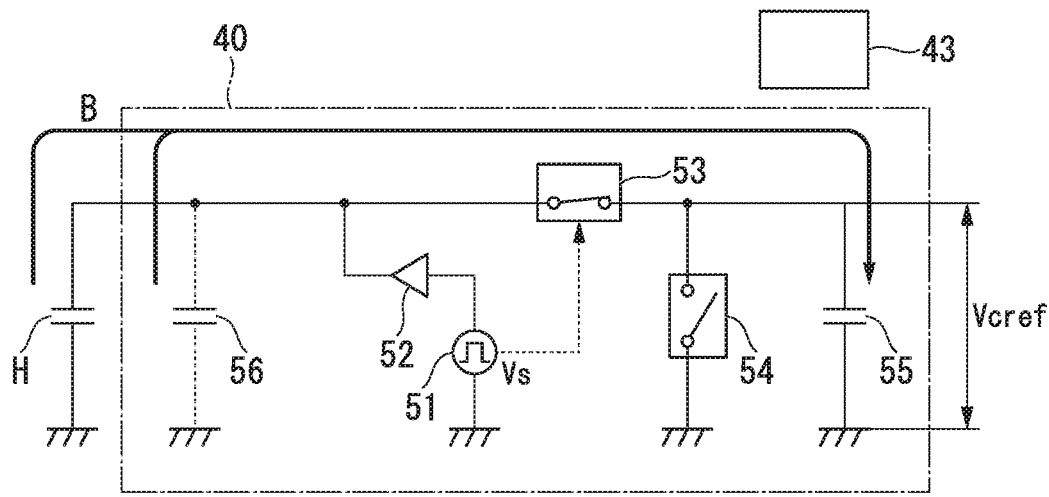
FIG. 6 is a diagram showing an example of the operation of the contact detection unit of the steering apparatus for a vehicle according to embodiments of the present invention and showing a conduction state of a first switch in accordance with falling of a pulse voltage.

Here, charge accumulated in the human body H and the virtual condenser 56 moves in a direction indicated by an arrow B in FIG. 6. Accordingly, the voltage Vhe of the human body H and the virtual condenser 56 decreases and thus the human body H and the virtual condenser 56 are discharged. In addition, the charging condenser 55 is charged and thus the charging voltage Vcref of the charging condenser 55 increases. Since the capacitance Cref of the charging condenser 55 is sufficiently greater than the capacitance Ch of the human body H and the stray capacitance Ce, most charge accumulated in the human body H and the virtual condenser 56 move to the charging condenser 55.

Thereafter, the human body H and the virtual condenser 56 are charged according to rising f the pulse voltage Vs and the charging condenser 55 is charged according to falling of the pulse voltage Vs. In addition, the charge amount and the charging voltage Vcref of the charging condenser 55 increase in accordance with increase in the number of pulses N.

Figure 7:
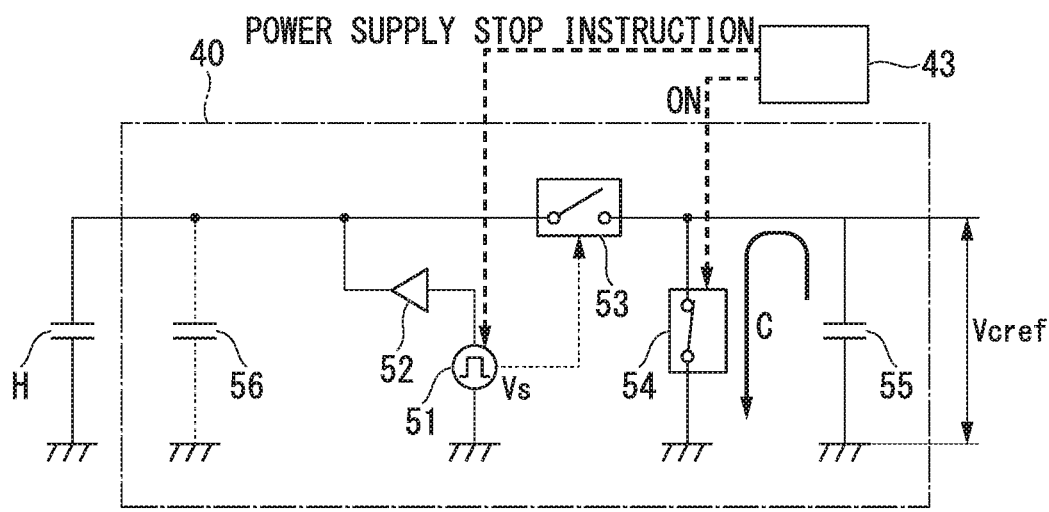
FIG. 7 is a diagram showing an example of the operation of the contact detection unit of the steering apparatus for a vehicle according to embodiments of the present invention and showing a state when power supply according to a pulse power source is stopped.

For example, the charging voltage Vcref of the charging condenser 55 may reach the charging voltage threshold value Vcth at a time at which the number of pulses N is a number of pulses Nj1. Here, the contact determination device 43 outputs the power supply stop instruction to the pulse power supply 51 and the pulse power supply 51 stops power supply. Further, the contact determination device 43 outputs the on signal to the second switch 54 and thus the second switch 54 switches to a conducting state. Here, charge accumulated in the charging condenser 55 moves in a direction indicated by an arrow C in FIG. 7 and the charging condenser 55 is discharged. When discharging of the charging condenser 55 ends, the contact determination device 43 outputs the off signal to the second switch 54 and thus the second switch 54 switches to a non-conducting state. Accordingly, the state returns to the power supply initiation state shown in FIG. 5. Then, the above process is repeated.

Meanwhile, although a hands-on state is assumed in the above-described embodiment, a basic operation in a hands-off case is the same as the above description except the fact that there is no charge accumulated in the human body H. However, a number of pulses Nj2 in a hands-off case is greater than the number of pulses Nj1 in a hands-on case.

Hereinafter, a process of calculating the capacitance Ch of the human body H will be described. Meanwhile, the stray capacitance Ce of the virtual condenser 56 is ignored in the following description.

A charge ΔQ accumulated in the human body H with one pulse voltage Vs of the pulse power supply 51 may be described by being represented by mathematical expression (1) below.

$$\Delta Q = Vs \times Ch \quad (1)$$

Since the capacitance Cref of the charging condenser 55 is sufficiently greater than the capacitance Ch of the human body H, almost all of the charge ΔQ moves to the charging condenser 40 when the first switch 53 is switched to a conducting state, as shown in FIG. 6. Accordingly, the charge ΔQ is described by being represented by mathematical expression (2) below according to an increment ΔVcref of the charging voltage Vcref of the charging condenser 55.

$$\Delta Q = Cref \times \Delta Vcref \quad (2)$$

According to the above mathematical expression (2), the increment ΔVcref of the charging voltage Vcref is described by being represented by mathematical expression (3) below.

$$\Delta Vcref = \Delta Q / Cref \quad (3)$$

When accumulation and movement of charge are repeated N times and thus the charging voltage Vcref of the charging condenser 55 reaches the charging voltage threshold value Vcth, the charging voltage threshold value Vcth is described by being represented by mathematical expression (4) below.

$$Vcth = \Delta Vcref \times N \quad (4)$$

The charging voltage threshold value Vcth is described by being represented by mathematical expression (5) below according to mathematical expressions (1), (3) and (4).

$$Vcth = \Delta Q / Cref \times N = Vs \times Ch / Cref \times N \quad (5)$$

The capacitance Ch of the human body H is described by being represented by mathematical expression (6) below according to the above mathematical expression (5).

$$Ch = (Vcth / Vs) \times (Cref / N) \quad (6)$$

As described above, the contact determination device 43 calculates the capacitance Ch of the human body H according to the charging voltage threshold value Vcth, the pulse voltage Vs of the pulse power supply 51, the capacitance Cref of the charging condenser 55, and the number of pulses N. Since the capacitance Ch changes according to the contact area between the human body H and the touch sensor 12, the contact determination device 43 infers the presence or absence of proximity and a contact type (contact or gripping, or gripping with both hands or gripping with one hand in the case of gripping) by measuring the capacitance Ch.

For example, the contact determination device 43 determines whether the driver (human body H) touches the touch sensor 12, that is, determines hands on or hands off on the basis of the number of pulses Nj necessary for the charging voltage Vcref of the charging condenser 55 to reach the charging voltage threshold value Vcth.

In the case of hands off, a charge amount $\Delta Q1$ charged according to pulses supplied one time by the pulse power supply 51 is $\Delta Q1 = Ce \times Vs = Cref \times Vcref$ and the charging voltage Vcref increases by $Vcref = (Vs/Cref) \times Ce$.

On the other hand, in the case of hands on, a charge amount $\Delta Q2$ charged one time according to pulses supplied one time by the pulse power supply 51 is $\Delta Q2 = (Ce+Ch) \times Vs = Cref \times Vcref$ and the charging voltage Vcref increases by $Vcref = (Vs/Cref) \times (Ce+Ch)$. Further, $\Delta Q1 < \Delta Q2$.

That is, a voltage increasing according to one-time power supply is different for hands on and hands off. Accordingly, the charging voltage Vcref of the charging condenser 55 reaches the charging voltage threshold value Vcth within a shorter time (fewer number of pulses N) in the case of hands on than in the case of hands off.

The contact determination device 43 in the present embodiment sets a pulse threshold value Nth and determines whether the number of pulses Nj necessary for the charging voltage Vcref of the charging condenser 55 to reach the charging voltage threshold value Vcth is greater than the pulse threshold value Nth. The contact determination device 43 determines hands on when the number of pulses Nj is equal to or less than the pulse threshold value Nth and determines hands off when the number of pulses Nj exceeds the pulse threshold value Nth.

The control unit 35 includes a software functional unit which functions according to execution of a predetermined program by a processor such as a central processing unit (CPU), for example. The software functional unit is an ECU including a processor such as a CPU, a read only memory (ROM) in which programs are saved, a random access memory (RAM) in which data is temporarily stored, and an electronic circuit such as a timer. Further, at least a part of the control unit 35 may be an integrated circuit such as a large scale integrated (LSI) circuit.

The control unit 35 is connected to a plurality of connection sockets 16a of the second connector 16. The control unit 35 is connected to the plurality of signal terminals 13a of the steering switch 13 through the plurality of connection sockets 16a of the second connector 16 and the plurality of connection pins 15a of the first connector 15.

The control unit 35 controls various board-on apparatuses 18 mounted in the vehicle 1 and an information terminal carried by an occupant of the vehicle 1, and the like according to a detection signal or an operation signal output from the steering switch 13. The various on-board apparatuses 18 mounted in the vehicle 1 are video and audio apparatuses, a navigation device, a camera, a display device and the like.

The control unit 35 is connected to the gate of the switch 33.

The control unit 35 is connected to the signal input terminal 14c of the switching device 14 through one connection socket 16a of the second connector 16 and one connection pin 15a of the first connector 15.

The control unit 35 is connected to a heater switch 19. For example, the heater switch 19 receives a predetermined operation from an operator and outputs a signal (instruction signal) for instructing execution of an operation of heating the steering wheel 2 to be permitted or stopped.

When the control unit 35 receives the signal for instructing execution of the operation of heating the steering wheel 2 to be permitted from the heater switch 19, the control unit 35 outputs an on/off switching signal stored in the ROM or the like to the gate of the switch 33 and the signal input terminal 14c of the switching device 14.

Figure 8:
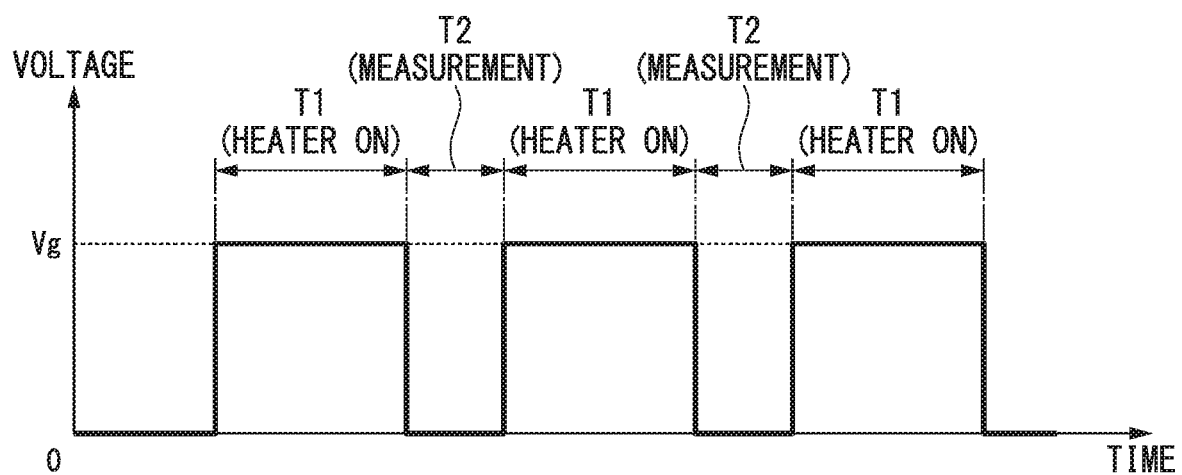
FIG. 8 is a diagram showing an example of an on/off switching signal output from a control unit of the steering apparatus for a vehicle according to embodiments of the present invention

For example, the on/off switching signal is a voltage signal according to rectangular pulses, as shown in FIG. 8. The on/off switching signal is a voltage signal in which an on time T1 of a predetermined voltage Vg and an off time T2 during which a voltage is almost zero are alternately repeated. The level of the predetermined voltage Vg is a level necessary to switch the switch 33 from an off state to an on state and a level necessary to start a switching operation of the switching device 14. When the switch 33 is a MOSFET, for example, the predetermined voltage Vg is a voltage applied across the gate and source of the switch 33 in order to switch the drain-source of the switch 33 from off to on.

The on time T1 is a time (heater ON time) during which the control unit 35 heats the steering wheel 2 according to electrification from the power supply 32 to the steering heater 11. At the on time T1, the switch 33 is on and electrification from the power supply 32 to the steering heater 11 is on. When electrification from the power supply 32 to the steering heater 11 occurs, the steering wheel 2 is heated according to heating of the steering heater 11.

Further, the on time T1 is a time during which the control unit 35 connects only the ground terminal 11b of the steering heater 11, among the steering heater 11, the touch sensor 12 and the steering switch 13 disposed in the steering wheel 2, to the body ground 31 according to the switching device 14.

The control unit 35 receives input of a detection signal and an operation signal output from the steering switch 13 and disables or prohibits the operation of the contact detection unit 34 at the on time T1.

The off time T2 is a time (measurement time) during which the control unit 35 receives input of a detection signal and an operation signal output from the steering switch 13 and enables or permits the operation of the contact detection unit 34. At the off time T2, the switch 33 is off and electrification from the power supply 32 to the steering heater 11 is off. When electrification from the power supply 32 to the steering heater 11 does not occur, proximity or contact of the driver (human body H) to or with the steering wheel 2 is detected according to a voltage signal input to the contact detection unit 34 from the touch sensor 12. Further, when electrification from the power supply 32 to the steering heater 11 does not occur, various on-board apparatuses 18 mounted in the vehicle 1 and an information terminal carried by an occupant of the vehicle 1, and the like are controlled according to a detection signal and an operation signal input to the control unit 35 from the steering switch 13.

Further, the off time T2 is a time during which the control unit 35 connects only the ground terminals 12b and 13b of the touch sensor 12 and the steering switch 13, among the steering heater 11, the touch sensor 12 and the steering switch 13 disposed in the steering wheel 2, to the body ground 31 according to the switching device 14.

For example, the proportions of the on time T1 to the off time T2 and the period of the on/off switching signal are proportions and a period according to predetermined time distribution through which the steering heater 11 can maintain a predetermined temperature.

In addition, the control unit 35 may change the proportions of the on time T1 to the off time T2 and the period of the on/off switching signal according to the temperature of the steering wheel 2 or the steering heater 11. For example, in a state in which the temperature of the steering heater 11 is lower than a predetermined temperature, such as an initial state in which the operation of the steering heater 11 starts, the control unit 35 may relatively increase a driving time of the steering heater 11 to raise the temperature of the steering heater 11 to a predetermined temperature and change the driving time of the steering heater 11 such that it relatively decreases. Further, the temperature of the steering wheel 2 or the steering heater 11 may be directly detected according to an appropriate temperature sensor or may be estimated on the basis of an operation history and operation timing of the steering heater 11, and the like.

As described above, according to the steering apparatus 10 for a vehicle according to the present embodiment, the switching device 14 switches connection destinations connected to one connection pin 15a among a plurality of electrical components. Accordingly, an increase in the number of connection pins 15a can be restrained even when a plurality of electrical components are provided in the steering wheel 2. Accordingly, it is possible to prevent a wiring structure from becoming complicated and costs necessary for components from increasing.

Furthermore, even when the steering heater 11, the touch sensor 12 and the steering switch 13 having different current regions in which current flows are commonly connected to the body ground 31 which is easily commonly used in a plurality of electrical components, appropriate operations thereof can also be secured. For example, it is possible to prevent signals from the touch sensor 12 and the steering switch 13 from being buried in noise and the like due to flowing current of the steering heater 11.

Further, with respect to the first connector 15 and the second connector 16, even when the number of electrical contacts (connection pins 15a and connection sockets 16a) in accordance with universal connector specifications is limited, for example, it is not necessary to increase the number of electrical contacts and it is possible to provide a plurality of electrical components in the steering wheel 2.

Hereinafter, modified examples of the above-described embodiment will be described.

In the above-described embodiment, electrical components having smaller current regions than the steering heater 11, as electrical components provided in the steering wheel 2, are not limited to the touch sensor 12 and the steering switch 13 and may include other electrical components, for example, a microphone and the like.

In addition, in the above-described embodiment, the control unit 35 may change the proportions of the on time T1 and the off time T2 and the period of the on/off switching signal according to an operation state of an electrical component having a smaller current region than that of the steering heater 11 among electrical components provided in the steering wheel 2. For example, in a case in which a microphone provided in the steering wheel 2 detects utterance of an operator, a process of recognizing a voice detected by the microphone is being performed, or the like, the control unit 35 may prioritize the off time T2 over the on time T1 such that such operation is not disturbed.

In the above-described embodiment, the control unit 35 may receive input of a detection signal and an operation signal output from the steering switch 13 and enable the operation of the contact detection unit 34 all the time in a state in which a signal instructing execution of an operation of heating the steering wheel 2 to be permitted has not been received from the heater switch 19.

Although the steering heater 11 and the touch sensor 12 are provided on the surface of the skin material 23 of the steering wheel 2 in the above-described embodiment, the present invention is not limited thereto. The steering heater 11 and the touch sensor 12 may be provided on the rear surface of the skin material 23 of the steering wheel 2.

Although the heater switch 19 receives a predetermined operation performed by an operator in the above-described embodiment, the present invention is not limited thereto.

For example, the heater switch 19 may detect at least any one of the vehicle interior temperature of the vehicle 1, the temperature of the steering wheel 2, a state of an occupant and the like and output a signal (instruction signal) for instructing execution of the operation of heating the steering wheel 2 to be permitted or stopped according to the detection result.

In the above-described embodiment, the whole control unit 35 or a part thereof may be a functional unit which functions according to a central processing unit (CPU) executing a program. In addition, such a configuration may be realized as an integrated circuit such as a large scale integration (LSI) circuit or the like and respective functional blocks thereof may be individually configured as processors or some or all thereof may be integrated into a processor. Further, a circuit integration method is not limited to LSI and the configuration may be realized as a dedicated circuit or a general-purpose processor. In addition, when a circuit integration technology which substitutes for LSI appears with the improvement of semiconductor technology, integrated circuits according to the technology may be used.

Embodiments of the present invention are exemplary and are not intended to limit the scope of the invention. Such embodiments may be embodied in various other forms and omissions, substitutions and modifications can be made in various manners without departing from the spirit or scope of the present invention. Such embodiments and modifications thereof are included in the scope and spirit of the invention and also included in the appended claims and their legal equivalents.

What is claimed is:

1. A steering apparatus for a vehicle, comprising:
a steering wheel;
a plurality of electrical components provided in the steering wheel;
a plurality of electrical contacts for supplying power to the electrical components or outputting signals from the electrical components to an external portion; and
a switching device which switches, when the plurality of electrical components are commonly connected to any one of the plurality of electrical contacts, connection destinations connected to the one electrical contact among the plurality of electrical components,
wherein the plurality of electrical components include a first electrical component and a second electrical component having different current regions in which current flows, and the one electrical contact to which the first electrical contact and the second electrical contact are commonly connected is a ground line.

2. The steering apparatus for a vehicle according to claim 1, wherein the first electrical component is a steering heater which has a larger current region than the second electrical component and heats the steering wheel, and the second electrical component is at least either of a touch sensor which detects proximity or contact of a human body to or with the steering wheel and a steering switch for operating an on-board apparatus provided in the steering wheel.

3. The steering apparatus for a vehicle according to claim 2, wherein the plurality of electrical contacts are connectors having a plurality of connection pins.

4. The steering apparatus for a vehicle according to claim 2, further comprising a control device which controls an operation of the switching device,
wherein the control device performs control of switching the connection destinations in a period in which the steering heater can maintain a predetermined temperature.

5. The steering apparatus for a vehicle according to claim 4, wherein the plurality of electrical contacts are connectors having a plurality of connection pins.

6. The steering apparatus for a vehicle according to claim 1, wherein the plurality of electrical contacts are connectors having a plurality of connection pins.

7. The steering apparatus for a vehicle according to claim 1,
wherein the plurality of electrical components of which connection destinations are switched by the switching device are connected to the ground line.

* * * * *